No. 720,219. PATENTED FEB. 10, 1903.
L. S. BURRIDGE.
TYPE WRITER CARRIAGE.
APPLICATION FILED OCT. 1, 1898.
NO MODEL. 5 SHEETS—SHEET 3.
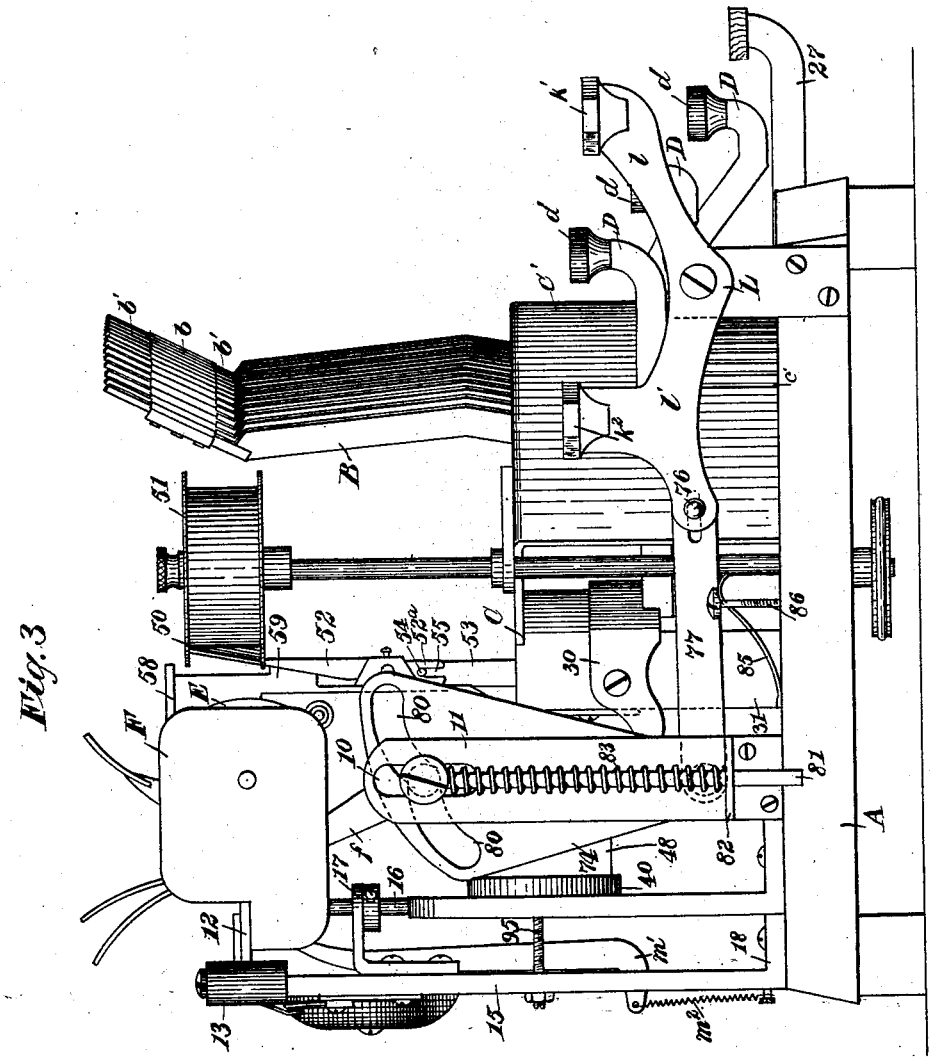
WITNESSES:
Geo. B Rowley,
M. V. Bidgood
INVENTOR
Lee S. Burridge
BY
ATTORNEYS

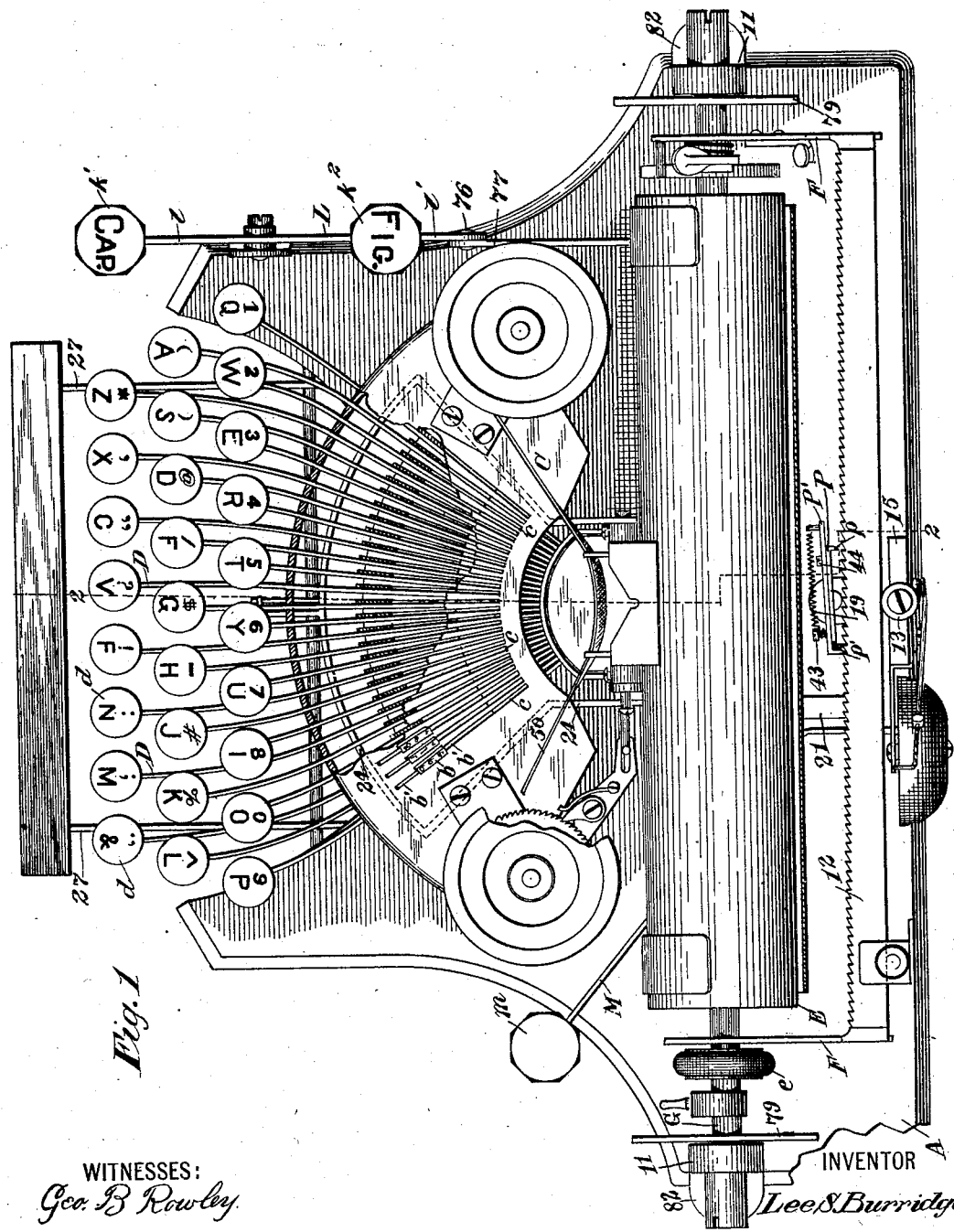

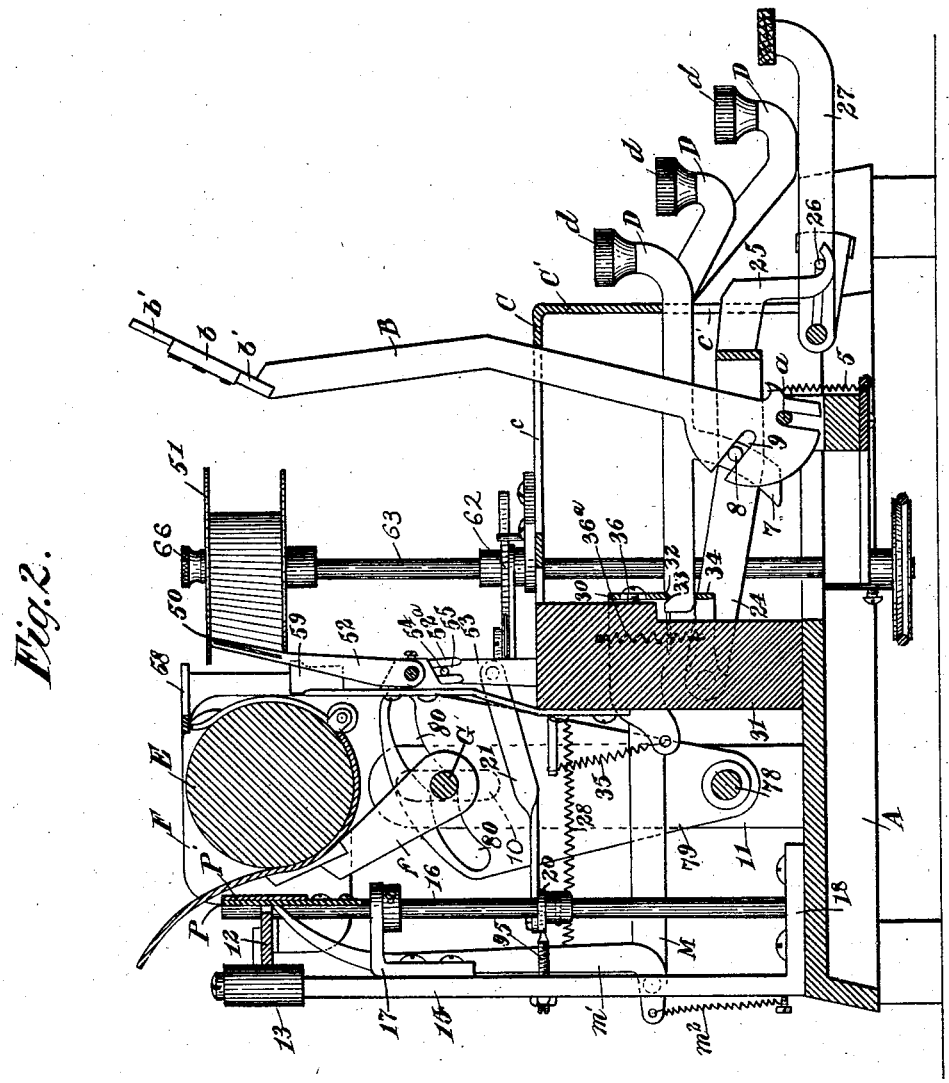

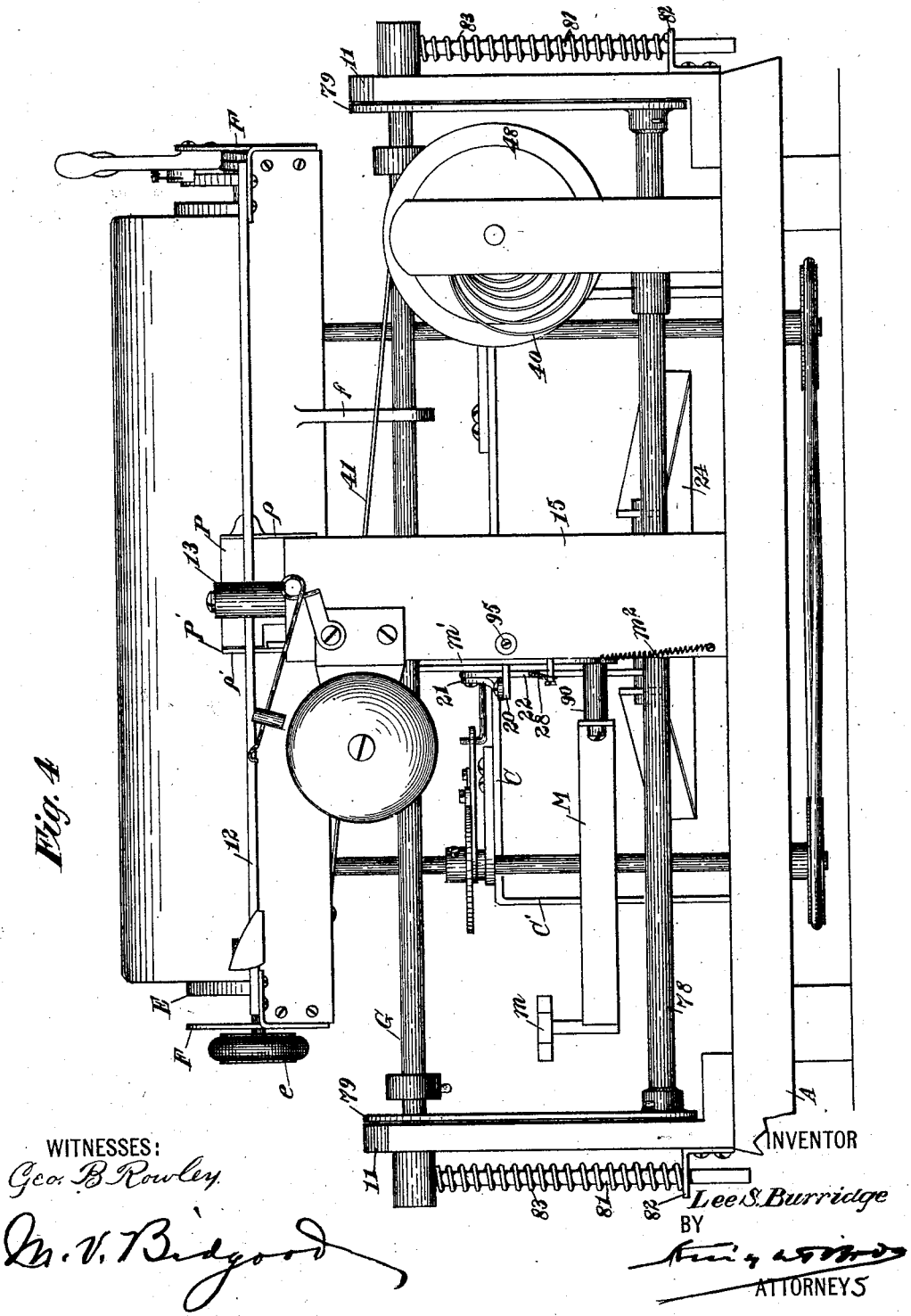

No. 720,219. PATENTED FEB. 10, 1903.
L. S. BURRIDGE.
TYPE WRITER CARRIAGE.
APPLICATION FILED OCT. 1, 1898.
NO MODEL. 5 SHEETS—SHEET 5.
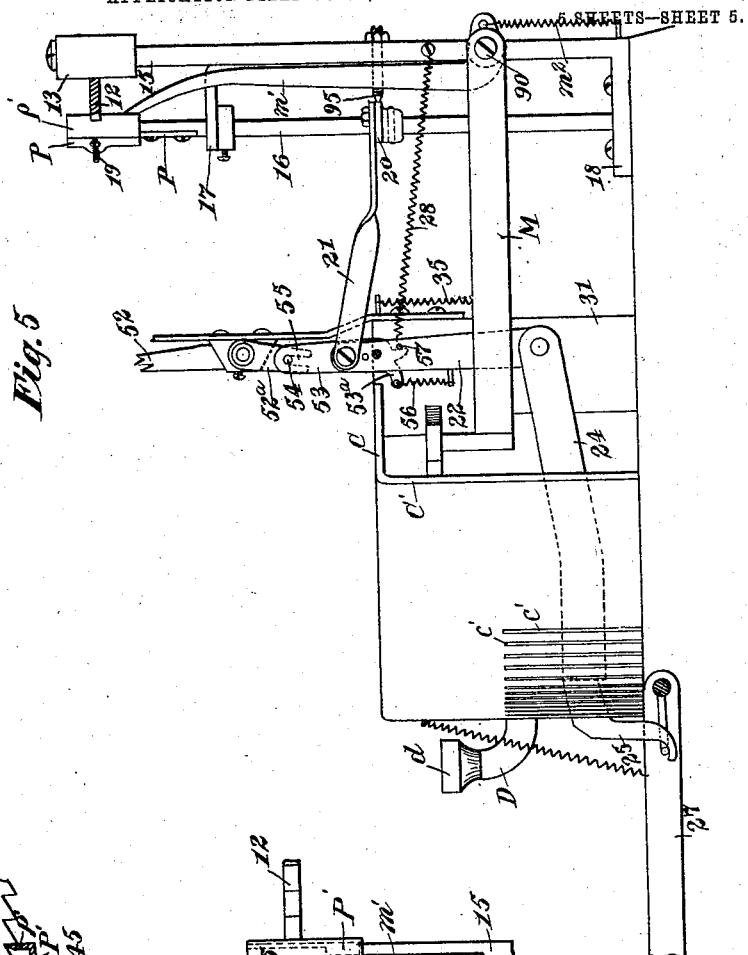
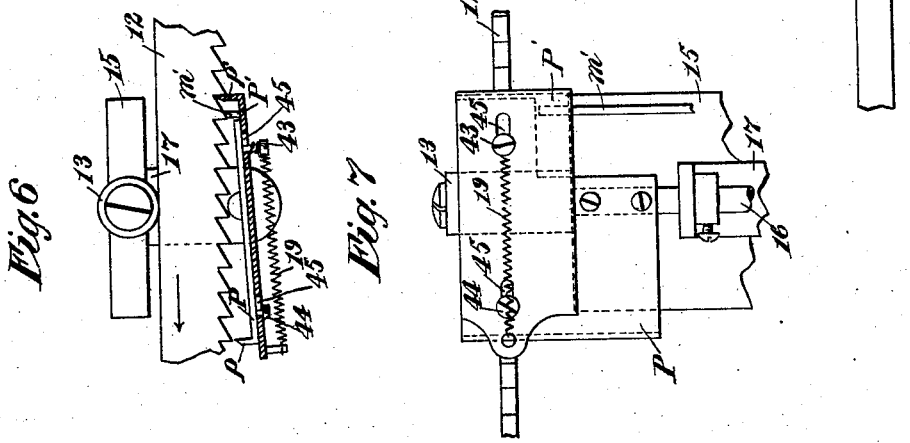
WITNESSES:
Geo. B. Rowley
M. V. Bidgood
INVENTOR
Lee S. Burridge
BY
ATTORNEYS

UNITED STATES PATENT OFFICE.

LEE S. BURRIDGE, OF NEW YORK, N. Y., ASSIGNOR TO THE UNION TYPE-WRITER COMPANY, OF JERSEY CITY, NEW JERSEY, A CORPORATION OF NEW JERSEY.

TYPE-WRITER CARRIAGE.

SPECIFICATION forming part of Letters Patent No. 720,219, dated February 10, 1903.

Application filed October 1, 1898. Serial No. 692,398. (No model.)

*To all whom it may concern:*

Be it known that I, LEE S. BURRIDGE, a citizen of the United States, residing at New York, in the county and State of New York, have invented certain new and useful Improvements in Type-Writer Carriages, of which the following is a specification.

This invention relates to improvements in type-writer carriages, and has especial reference to the carriages of machines with individual type-bars, each carrying a plurality of types, although certain features of the invention are applicable to other forms of typewriting machines.

In the accompanying drawings, which form a part of this specification, Figure 1 is a plan view of a type-writing machine embodying my invention. Fig. 2 is a central vertical sectional view of same, the plane of section being indicated by the dotted line 2 2, Fig. 1. Figs. 3 and 4 are respectively side and rear views. Figs. 5, 6, and 7 show details.

A represents the frame or base of the machine, and B the type-bars pivotally supported thereon at $a$. The type-bars B are provided with retracting-springs 5 and are guided in slots $c$ in a horizontal comb-plate C. Each type-bar B carries at its upper end a type-block $b$, having a plurality of types formed thereon or affixed thereto. I prefer to form it with three type, arranged one above another, corresponding to three different positions of the platen, as hereinafter described.

The horizontal comb-plate C is fastened to and supported above the base A by a vertical comb-plate C', fastened in any suitable manner to the base A. Vertical slots $c'$ in this comb-plate receive and guide the key-levers D, carrying the keys $d$, and said key-levers are pivoted at their inner ends to a support or fulcrum, as hereinafter described, and have downwardly-projecting arms 7, carrying pins 8, engaging in notches 9 in the lower portion of the respective type-bars. As the key-levers are depressed they carry the pins 8 downward, and thus throw the type-bars forward. Owing to the arc or segmental form of the pivot-rod for the type-bars and the consequent segmental disposition of said bars the latter are caused when in action to move toward the platen in converging paths, the point of meeting of these paths being the point at which impression is effected against the platen. The slots $c$ in comb-plate C are of course properly arranged to conform to these converging paths.

The cylindrical platen E is substantially in the same horizontal plane as the types (it is here shown slightly below them) and is turned in the usual manner on a carriage F by a knob $e$. The carriage is supported by arms $f$, attached to the carriage-frame and loosely embracing a horizontal rod G, which is arranged below and parallel with the carriage and is guided at the ends in slots 10, formed in vertical standards 11 on the base. Shifting devices, hereinafter described, support this rod G in the said slots at different elevations corresponding to the several sets of types on the type-bars. Thus there being in this case three types on each type-bar the platen is, by the aforesaid devices, held in any one of three different elevations, so as to cause one or another of these types to come against the platen when the corresponding key is struck.

The key-levers D are here shown as supported on a yielding fulcrum consisting of a U-frame 30, whose two arms embrace and are pivoted to a central standard 31, projecting up from the base of the machine, has a knife-edge 32 bearing down on the top of the rear ends of the key-levers, said knife-edge engaging in notches 33 in the tops of the key-levers. Another U-frame 34, embracing and pivoted to the standard 31, bears up against the bottom of said key-levers. A strong spring or springs 35 holds the frame 30 down against a fixed stop 36, and a weaker spring $36^a$ holds the frame 34 up against the key-levers. This construction is fully described and claimed in my application, Serial No. 669,807.

At the back of the carriage F is the escapement rack-bar 12, whose smooth rear edge runs against the periphery of a roller 13, mounted on a vertical pivot on the top of a standard 15. The carriage is thus held against backward movement, and the roller 13 is made of sufficient length or height to permit of the above-described up-and-down movement of the carriage without the bar 12 leaving the roller 13. The carriage is so constructed that its center of gravity is in rear of the supporting and guiding bar G, and thus its rearmost member—to wit, the rack-bar 12—rests normally against the roller 13.

The escapement mechanism consists of a sliding vertical plate P' and a vertical plate P, carried by a vertical pivot-post 16, pivoted in the brackets 17 and 18, extending from standard 15. The plate P' slides on the plate P and is held toward the starting end of the carriage by a spring 19, which is attached at its opposite ends to the respective plates. Vertical knife-edge flanges $p$ $p'$ are formed, respectively, on said two plates and form escapement teeth or detents which engage with the teeth on the front side of the rack-bar 12. The detents are made in this vertical knife-edge form so as to maintain engaging relation with the rack as the carriage is moved up or down by the shifting mechanism hereinafter described, the width of the detents being sufficient to enable them to maintain contact with the rack-bar at all vertical positions thereof. An arm 20 on pivot-post 16, working against an adjustable screw-stop 95, is connected by link 21 to an arm 22 of the universal lever, whose other arm 24 is in the form of a U frame extending under all of the type-key levers, so as to be operated by the depression of any one of said levers, and also carries an arm 25, engaging with a pin 26 the spacing-key 27. A spring 28 serves to hold the arm 22 of the universal lever toward the back of the machine, and thereby to normally so turn the pivot-post 16 as to force the detent $p'$ into engagement with the rack 12. Under these circumstances the rack-bar under the impulse of the carriage-propelling spring 40 (which is connected to the carriage by the usual drum 48 and a flexible connection 41 wound thereon) drives the plate P' in the direction of the arrow in Fig. 6 until its knife-edge flange strikes the end of the plate P, which acts as a stop, and the carriage is thus brought to rest. As soon as any key-lever, whether of a type or space key, is depressed it operates through the universal mechanism above described to turn the pivot-post 16 and the plates P P', carried thereby, so as to carry the detent $p$ into engagement with the rack and then to free the detent $p'$ from such engagement. The detent $p$ catches the rack before it is released and prevents any movement thereof, while the detent $p'$ is protracted by its spring 19 into position for engagement with the next succeeding tooth. Such engagement is, however, prevented by the angular position of the plates P P' until the key-lever is released, whereupon the plates are turned in the reverse direction and the detent $p'$ is thus brought into engagement with the rack and the detent $p$ then released therefrom. The carriage-propelling spring then drives the rack-bar, as before, until the detent $p'$ is stopped by the end of the plate P. Thus the carriage is advanced one tooth on each operation of the universal spacing mechanism.

At Figs. 6 and 7 is shown diagrammatically the position of the plates P P' when the key-lever is released, and hence during the return of the universal bar and connected parts to normal position. At these figures the carriage is just beginning its letter-space movement toward the left, as indicated by the arrow at Fig. 6. These figures also illustrate the protracted position assumed by the plate P' during the return movement of the carriage to the right.

In order to enable the carriage to be drawn freely in the reverse direction whenever desired, the plate P' is mounted loosely on plate P by means of studs 43 44 on plate P, passing through slots 45 in plate P', the stud 44 farther from the toothed end having a head holding the plate P' in plate P, but said head being removed sufficiently from the plate to permit the other end of plate P' to be tilted away from plate P, so as to allow the detent $p'$ to ride freely over the rack-teeth when the inclined faces of same strike the said detent. The head of the pin, to which the left-hand end of the spring 19 is secured, has accordingly a horizontal pivotal motion about the axis 44 during the vibration of the plate P' by the teeth of the rack, thereby slightly stretching the spring 19. Whenever the tooth $p'$ escapes over the point of a rack-tooth, the spring 19 is enabled by swinging the said pin and plate P' about the stud 44 as a pivot to cause the right-hand end of the plate P' to swing horizontally rearwardly, so that said tooth $p'$ enters the next notch in the rack. In other words, the plate P' may be regarded as a lever of the first order with a vertical axis or fulcrum upon the screw 44, which screw, as well as the screw 43, is attached to the relatively fixed plate P. One end of the spring 19 being attached to the screw 43 on the fixed plate and the opposite end to the pin on the movable plate the said spring has a normal tension to hold the plate P' against or parallel with the plate P. At the same time, owing to the disposition of the spring 19, it is capable of moving the plate P' longitudinally for letter-spacing movements, as explained, and it will be observed that owing to the peculiar connection and arrangement of the spring 19 when the lever-like plate P' is vibrated by the return movement of the rack the said spring 19 is put under further tension, whereby the dog $p'$ is enabled to bob into the next notch of the returning rack. Hence the spring 19 serves the double purpose of holding the plate P' in yielding contact with the plate P, as well as of protracting the plate P' for engagement with the next tooth, as above described. It being understood that the detent $p$ is normally disengaged from the rack-bar, it is clear that the carriage may be completely freed from the escapement at any time by pressing the plate P' forward so as to release the detent $p'$ from the rack. To effect this, I provide a lever or arm M, having an operating-key $m$ and fastened to a rock-shaft 90, with an arm $m'$ arranged to engage with or strike against the plate P' when said key is depressed, so as to push said plate forward and release the detent $p'$, whereupon the carriage may be freely moved in either direction. Arm M has a spring $m^2$ for returning it to normal position.

50 represents the ink-ribbon carried by ribbon-spools 51 and passing through a vibrating frame 52, which is so connected to the universal spacing mechanism as to carry the ribbon toward and away from the platen as the type approaches and leaves the platen. For this purpose the frame 52 is pivoted to the standard 31 and has an arm $52^a$ connected to the arm 22 of the universal spacing mechanism, such connection being preferably effected through an intermediate lever 53, which permits the ink-ribbon frame to yield when it comes in contact with the platen, so as not to prevent the continued movement of the universal spacing mechanism. This lever 53 engages by a pin 54 with a slot 55 on the arm $52^a$ of frame 52 and is pivoted to the arm 22, a spring 56 holding an arm $53^a$ of said lever 53 against a stop 57, so that vibration of the universal spacing mechanism causes vibration of the frame 52, as aforesaid. The spring 56 is stiff enough to hold the lever 53 ordinarily against its stop during such motion, but permits the frame 52 to yield when brought up against the platen, as aforesaid.

Fixed guide-plates 58 59 are placed, respectively, above and below the printing-point—that is to say, the point at which the type strike the platen—these guide-plates being placed far enough apart to permit the passing of the ribbon and the type-blocks between them and being supported by the standard 31. Each of these fixed guide-plates has a notch in line with the printing-point to insure exact alinement of the type in printing, and the type-blocks 6 are mounted on stems $b'$, which engage in such notches both above and below the type-block. On each side of said notches the forward sides of the guide-plate are flared forward and outward in V shape, with the aforesaid notch at the apex, so as to insure the passage of the type-block stems into said notches.

I will now describe the mechanism whereby the carriage, with the platen carried thereby, is shifted vertically to correspond to the different sets of type on the type-blocks. Normally the carriage is supported in an intermediate or central position, and it is shifted up or down, as the case may be, by a two-armed shift-key lever L, whose arms $l\,l'$, carry, respectively, the raising-key $k'$ and the depressing-key $k^2$. The shift-lever L engages by a pin 76 with an arm 77, fastened to a rock-shaft 78, passing from end to end of the machine and journaled in the standards 11. The rock-shaft 78 also carries at the respective ends of the machine arms or plates 79, wherein are formed eccentric slots 80, which receive the carriage-supporting rod G. Said rod G slides up and down in the slots 10 in standards 11, and a vertical arm 81 on each end of said rod passes down through and slides in a hole in a lug 82 on said standard. Springs 83 between the rod G and lugs 82 are of such length that when the said rod is depressed from its middle position these springs will tend to force it upward, but when said rod is raised from its middle position it leaves said springs, and thus tends to return to such position by the action of gravity. The cam-slots 80 are formed with a depression or "rest" in the middle, and in the normal position of the shift-key L (shown in Fig. 2) this portion of the cam-slots is in engagement with the rod G, thus holding the carriage and platen in the normal or mean position. On striking either of the shift-keys the arms 79 will be thrown one way or another, and the eccentric portions of the cam-slots 80 will engage with the rod G and force the carriage up or down, as the case may be, the three positions of the rod corresponding to the positions of the type on each type-block, as above stated. Since the arms 79 move alike, both ends of the platen-carriage are forced up or down simultaneously by the cams 80, and hence the platen is always maintained in a horizontal position. In other words, the position of the platen at each shift is parallel with its position at the other shifts, thus preserving the alinement of the writing. A spring 85 may also be arranged on the base to engage with the arm 77 when the latter is depressed so as to "kick" the carriage back to its middle position. The upward motion of the spring 85 is limited by a screw-stop 86.

It will be noted that the pivots of the spacing-dogs P and P' are arranged transversely of the carriage letter-spacing movements and that all parts of the dog-teeth $p$ and $p'$ have the same amount of motion, so that no disturbance of the rack-and-dog action arises in consequence of shifting the carriage and rack vertically. It will also be observed that the described cam mechanism is constructed both to cause transverse movement of the platen and to maintain the platen in parallelism during such movement thereof, this result being secured by arranging similar cams upon the arms 79. It will also be seen that a single guide-bar is arranged immediately under the platen-frame, that said platen-frame is supported and adapted to move longitudinally upon said bar, and that the platen-frame is provided with a bar 12 parallel with said guide-bar and arranged to travel and bear upon a relatively fixed auxiliary abutment or support arranged centrally of the machine and in rear of the platen; also, that a rock-shaft 78, parallel with said guide-bar, is journaled in the standards 11 below said guide bar or rail and provided with upwardly-extending arms having means at their upper ends for imparting vertical movements to said guide-bar, said arm being arranged at the end portions of said guide-bar.

Having thus described my invention, the following is what I claim as new therein and desire to secure by Letters Patent:

1. In a type-writing machine, in combination with a series of type-bars having a plurality of types on each bar, of the platen-carriage, shiftable relatively to said types, means for guiding said platen-carriage in its shifting motion, cam mechanism constructed to shift said platen in opposite directions from a central normal position, and constructed both to cause transverse movement of the platen and to maintain the platen in parallelism during such transverse movement thereof and suitable shifting-keys for said cam mechanism, substantially as set forth.

2. In a type-writing machine, the combination of vertically-slotted standards, a horizontal guide-rod arranged within the slots of said standards, means for vertically adjusting said rod and a paper-carriage supported and guided upon said rod, substantially as set forth.

3. In a type-writing machine, the combination of the guiding-standards 11, the horizontal rod G supported thereby and guided thereon, spring-supports for said rod, a carriage supported upon and moving longitudinally upon said rod and suitable shifting mechanism for said rod, substantially as set forth.

4. In a type-writing machine, the combination of a supporting-guide and shift-rod, the paper-carriage supported thereon and having capacity of movement longitudinally thereof and adapted to shift therewith, a rack-bar fixed on said carriage so as to shift bodily therewith, and an abutment or supporting roller against which said rack-bar rests and travels, substantially as set forth.

5. In a type-writing machine, the combination of a supporting guide-rod, a paper-carriage supported on and having capacity of longitudinal movement thereof, means for shifting said paper-carriage vertically and a supporting abutment-roller against which said paper-carriage rests and moves and having sufficient depth to accommodate the shifting motion of said carriage, substantially as set forth.

6. In a type-writing machine, the combination of a platen, a platen-frame, a series of type-bars arranged forwardly thereof, a horizontal rail upon which said platen-frame is guided and by which it is shifted vertically, a rock-shaft arranged parallel with said rail and mounted upon a fixed portion of the machine, and means arranged upon said shaft for moving said rail in opposite vertical directions from a central normal position, substantially as set forth.

7. In a type-writing machine, the combination of a platen, a platen-frame, a series of type-bars arranged forwardly thereof, a horizontal rail arranged below the platen upon which rail said platen-frame is guided, a rock-shaft arranged below said rail and parallel therewith and mounted upon a fixed portion of the machine, and a pair of arms fixed upon said rock-shaft and provided with means for imparting to said horizontal rail opposite vertical movements from a central normal position, substantially as set forth.

8. In a type-writing machine, the combination of a platen, a platen-frame, a horizontal rail upon which said platen-frame is guided, said rail being arranged below the platen-frame, a rock-shaft, arms fixed upon said rock-shaft and adapted at their outer free ends to carry said rail, and a key-operated lever also fixed upon said rock-shaft and adapted to impart movement thereto in opposite directions from a central normal position, substantially as set forth.

9. In a type-writing machine, the combination of a pair of standards each vertically slotted at its upper end, a horizontal rail extending across the machine and engaging said slots, a rock-shaft journaled in said standards, and upwardly-extending arms fixed upon said rock-shaft, said arms being provided at their upper ends with means for positively engaging said horizontal rail and positively moving it and the platen-frame vertically in opposite directions from a central normal position.

10. In a type-writing machine, the combination of a platen, a platen-frame, a horizontal rail upon which said platen-frame travels and by which it is guided, and a key-operated cam mechanism arranged at the end portions of said rail and adapted to cause transverse movements of the latter in opposite directions from a central normal position, substantially as set forth.

11. In a type-writing machine, the combination of a platen, a platen-frame, a horizontal rail upon which said platen-frame is guided, a key-operated rock-shaft arranged below said rail and parallel therewith, and upwardly-extending arms fixed upon said rock-shaft, the upper ends of said arms being provided with cams with which said rail engages and by which it is caused to move vertically in opposite directions from a central normal position, substantially as set forth.

12. In a type-writing machine, the combination of a platen-frame, a shift-rail therefor, and a key-operated cam for shifting said rail and platen-frame both ways from a normal central position, said cam being provided with a rest portion midway thereof, substantially as set forth.

13. In a type-writing machine, in combination with a shiftable and longitudinally-moving paper-carriage, a rod wherewith said carriage has traveling connection, suitable shift-keys and cam levers or plates in operative connection with said shift-keys and having cam-slots engaging said rod, the said slots having central rest portions for holding said rod in normal, central position, substantially as set forth.

14. In a type-writing machine, the combination with a series of type-bars of a transversely-shiftable platen-carriage, means for guiding said platen-carriage in its longitudinal movements, cam mechanism having operative connection with the platen and constructed both to cause transverse movement of the platen and to maintain the platen in opposite directions from a central normal position in parallelism at the transverse movement thereof, and a spring for returning said cam mechanism.

15. In a type-writing machine, the combination with a series of keys, of a platen, a platen-frame, a rack secured upon said platen-frame, means for shifting said platen-frame and rack together transversely, a feeding-dog and a coacting detent-dog both suitably mounted upon a fixed portion of the machine and suitably controlled by the keys and also adapted to control through said rack the letter-spacing movements of the carriage at all transverse positions thereof, substantially as set forth, said feeding-dog being moved by the rack at each advance movement of the latter.

16. In a type-writing machine, the combination of a longitudinally-moving paper-carriage, a rack-bar carried thereby, means for shifting said paper-carriage transversely of said rack-bar, escapement-plates pivotally supported on the machine-frame and having detents engaging said rack-bar of sufficient width to maintain contact with said rack-bar in various positions of the carriage, the pivotal axis of said plates being arranged transversely of the longitudinal movements of the carriage, and means for vibrating the said escapement-plates, substantially as set forth.

17. In a type-writing machine, the combination of a longitudinally-moving and transversely-shifting paper-carriage, a feed rack-bar fixed thereto, a pivoted escapement-plate, a spring for holding said plate normally disconnected from said rack-bar, a second escapement-plate arranged to slide upon the first and held by said spring mechanism in normal engagement with said rack-bar, both of said escapement-plates having teeth of sufficient width to maintain contact with said rack-bar during the transverse shifting movements of the carriage, means for vibrating said plates and a spring for protracting said sliding escapement-plate substantially as set forth.

18. In a type-writing machine, in combination with a paper-carriage, a feed rack-bar fixed thereto, a pivoted escapement-plate normally disengaged from said rack-bar a second escapement-plate supported on the first so as to slide thereon and vibrate relatively thereto, means for vibrating said escapement-plates together and a spring for protracting said sliding escapement-plate and holding it in yielding contact with the rack-bar, substantially as set forth.

19. In a type-writing machine, the combination of a paper-carriage, means for shifting said paper-carriage, a pivoted escapement-plate engaging said rack-bar and of sufficient width to maintain said engagement in the various movements of the paper-carriage, a second escapement-plate having a spring for protracting it in a direction opposite to the letter-feeding movement of the carriage, and for holding it in yielding contact to said rack-bar and a lever and operating-key therefor arranged to engage said second plate and disengage it from said rack-bar, substantially as set forth.

20. In a type-writing machine, the combination of a longitudinally-moving and transversely-shifting paper-carriage, a feed rack-bar fixed thereto, escapement-plates having detents of sufficient width to engage the teeth of said rack-bar at all transverse positions of the carriage, and a pivoted post upon which said escapement-plates are mounted, said pivoted post having suitable connection with the universal spacing mechanism, substantially as set forth.

21. In a type-writing machine, the combination of a longitudinally-moving and transversely-shifting paper-carriage, a rack-bar secured thereto, escapement-plates adapted to coact with said rack-bar at all the transverse positions thereof and having a common pivotal support, and a spring for moving one of said plates in a direction opposite to the letter-feeding movement of the carriage.

22. In a type-writing machine, the combination with a series of type-bars each having a plurality of types, of a platen-carriage, means for guiding the same, cam mechanism constructed to shift said platen-carriage from a normal position to a plurality of different positions and to constantly control the position of said carriage and maintain the platen in parallelism during its transverse movements, and a plurality of shift-keys for operating said cam mechanism.

LEE S. BURRIDGE.

Witnesses:
HARRY E. KNIGHT,
M. V. BIDGOOD.